(12) United States Patent
Lei

(10) Patent No.: US 6,169,391 B1
(45) Date of Patent: Jan. 2, 2001

(54) DEVICE FOR CONVERTING HIGH VOLTAGE ALTERNATING CURRENT TO LOW VOLTAGE DIRECT CURRENT

(75) Inventor: Jimes Lei, San Jose, CA (US)

(73) Assignee: Supertex, Inc., Sunnyvale, CA (US)

( * ) Notice: Under 35 U.S.C. 154(b), the term of this patent shall be extended for 0 days.

(21) Appl. No.: 09/351,724

(22) Filed: Jul. 12, 1999

(51) Int. Cl.[7] ........................................ G05F 1/40
(52) U.S. Cl. ........................ 323/266; 323/273; 363/89
(58) Field of Search ........................ 363/125, 126, 363/89; 323/266, 273, 274, 275

(56) References Cited

U.S. PATENT DOCUMENTS

| | | | |
|---|---|---|---|
| 3,777,253 | * 12/1973 | Callan | 323/266 |
| 4,010,401 | * 3/1977 | Yasumatsuya et al. | 323/273 |
| 4,568,877 | * 2/1986 | Tinsley | 323/266 |
| 5,132,893 | * 7/1992 | Klein et al. | 363/49 |
| 5,258,701 | * 11/1993 | Pizzi et al. | 323/273 |
| 5,357,418 | * 10/1994 | Clavel | 323/266 |
| 5,414,340 | * 5/1995 | Gannon | 323/266 |
| 5,528,485 | * 6/1996 | Devilbliss et al. | 363/89 |
| 5,894,243 | * 4/1999 | Hwang | 323/266 |
| 5,929,663 | * 7/1999 | Dougherty | 363/126 |

* cited by examiner

Primary Examiner—Peter S. Wong
Assistant Examiner—Gary L. Laxton
(74) Attorney, Agent, or Firm—Paul W. Davis; Harry M. Weiss & Associates, P.C.

(57) ABSTRACT

A device which rectifies and regulates high voltage alternating current without the use of transformers, large capacitive coupling circuits or high voltage linear regulators. The device includes a rectifier, a control circuit for sensing the output voltage of the rectifier and switching on and off the input power, a storage capacitor and a low voltage linear regulator. The control circuit, which incorporates a voltage sensing circuit and a switch, limits the output voltage of the rectifier as seen by the linear regulator.

20 Claims, 5 Drawing Sheets

DEVICE FOR CONVERTING HIGH VOLTAGE ALTERNATING CURRENT TO LOW VOLTAGE DIRECT CURRENT

BACKGROUND OF THE INVENTION

1. Field of the Invention

This invention relates generally to the conversion of high voltage alternating current (AC) to low voltage direct current (DC). Specifically the present invention relates to an apparatus and a method for converting high voltage AC to low voltage DC without the use of transformers, large capacitive coupling circuits or high voltage linear regulators.

2. Description of the Related Art

There are devices such as consumer appliances and electronics, i.e. refrigerators, washing machines, dishwashers, microwave ovens, televisions, video cassette recorders, audio components, etc., which require high voltage AC power and low voltage DC power. The low voltage DC requirement is for powering analog and digital control circuitry, display indicators such as Light Emitting Diodes and other low power devices.

The prior art identifies attempts to provide AC to DC conversion in three principal categories: the transformer approach, the high voltage linear regulator approach and the high voltage capacitive coupling approach. Each of these three approaches has limitations which are discussed below.

Referring to FIG. 1, the transformer approach with full wave rectifier is illustrated. The step down transformer will drop the input voltage, which is typically 110–120 VAC for devices operating in the U.S. and Canada and typically 220–240 VAC for devices operating in Europe and elsewhere in the world, to a low voltage in the range of 5–24 VAC, depending on the application. After step down, the sinusoidal AC input is then rectified by a full wave rectifier, i.e. diodes D1, D2, D3 and D4. The capacitors C1 and C2 combine with the linear regulator to provide a stable DC output voltage.

The disadvantage to this approach, and to all transformer approaches, is the prohibitive cost, size, weight and power consumption of step down transforms. Furthermore, the approach of FIG. 1 also requires a four diode bridge rectifier.

Referring to FIG. 2, a step down transformer is used in conjunction with a half wave rectifier. The transformer provides a low voltage AC component as in FIG. 1. However, in the case of FIG. 2, a single diode D1 is used to form the half wave rectifier. The capacitors C1 and C2 with the linear regulator provide a stable DC output voltage. Although this approach uses only one diode, as compared to four diodes in FIG. 1, the capacitor C1 must be significantly larger than its counterpart in the full wave rectifier configuration to compensate for the half wave rectification. Thus, the disadvantage to this approach, in addition to the step down transformer, is the size of the capacitor C1.

Referring to FIG. 3, another configuration of the transformer approach is illustrated using a center tap transformer and a full wave rectifier comprised of diodes D1 and D2. The center tapped transformer, while permitting a two diode full wave rectifier, adds complexity and therefore cost to the configuration.

Referring to FIG. 4, the high voltage linear regulator approach is illustrated. In this approach, the bulky and costly step down transformer is eliminated from the circuit. The high voltage AC input is rectified by the full wave rectifier, diodes D1, D2, D3 and D4 and stored by capacitor C1. The high voltage linear regulator reduces the high DC voltage to a low DC output voltage, typically in a range of 5–24 VDC. Capacitor C2 provides a filter for the DC output voltage. The disadvantage of the high voltage linear regulator approach is excessive power dissipation caused by the storage of high voltages on capacitor C1.

Referring to FIG. 5, the high voltage capacitive coupling approach is illustrated. Once again the step down transformer is eliminated. Capacitor C1 couples the AC component to the full wave rectifier, i.e. diodes D1, D2, D3 and D4, across resistor R1. The zener diode Z1 limits the output of the full wave rectifier to the desired low voltage DC output. Capacitor C2 provides a filter for the DC output voltage. Although this approach reduces the power consumption over the approach shown in FIG. 4, the size of capacitor C1 is prohibitively large.

Therefore, a solution to the complexity, cost and size limitations imposed by the transformer approach, the high voltage linear regulator approach and the high voltage capacitive coupling approach of the prior art was needed for converting high voltage alternating current to low voltage direct current.

BRIEF SUMMARY OF THE INVENTION

It is an object of the present invention to convert high voltage alternating current to low voltage direct current without the use of one or more transformers.

It is an object of the present invention to convert high voltage alternating current to low voltage direct current without the use of large capacitive coupling circuits.

It is an object of the present invention to convert high voltage alternating current to low voltage direct current without the use of high voltage linear regulators.

It is another object of the present invention to provide a rectifier, which may be either a full wave rectifier or a half wave rectifier, for converting high voltage alternating current to high voltage direct current.

It is another object of the present invention to provide a control circuit for detecting the voltage level of the high voltage DC input power signal and for switching on and off the connection between the high voltage DC input power signal and the low voltage direct current output signal. The control circuit also limits the voltage as seen by the linear regulator and the storage capacitor.

It is still another object of the present invention to provide a linear regulator for limiting the DC voltage output as seen by the load and for removing voltage anomalies induced by the charging and discharging of the storage capacitor.

It is still another object of the present invention to provide a storage capacitor which charges when the switch within the control circuit is on and which discharges when the switch within the control circuit is off.

In accordance with one embodiment of the present invention, a device for converting high voltage alternating current to low voltage direct current comprises an alternating current (AC) input voltage; a rectifier coupled to the AC input voltage; a control circuit coupled to the rectifier; a linear regulator coupled to the control circuit; and a storage capacitor coupled to the control circuit and further coupled to the linear regulator.

In accordance with another embodiment of the present invention, the invention further comprises a filtering capacitor coupled to the linear regulator.

In accordance with still another embodiment of the present invention, the control circuit comprises a voltage sensing circuit and a switch.

The foregoing and other objects, features, and advantages of the invention will be apparent from the following, more particular, description of the preferred embodiments of the invention, as illustrated in the accompanying drawings.

DETAILED DESCRIPTION OF THE INVENTION

Figure 1:
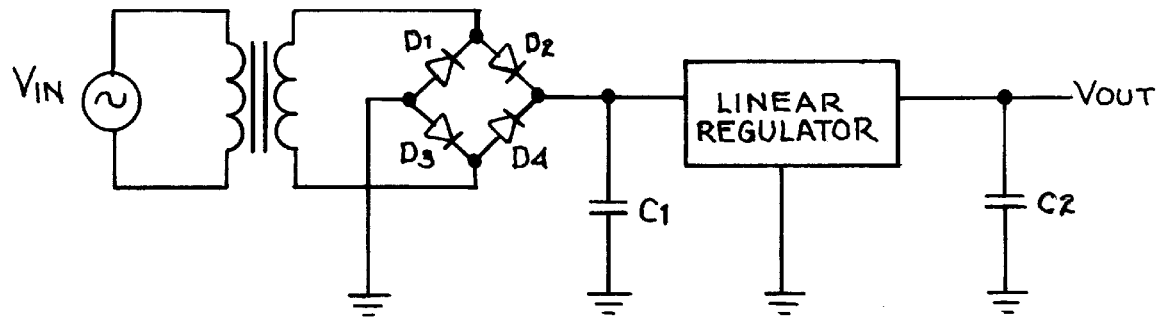
FIG. 1 is a schematic diagram illustrating the step down transformer approach with a full wave rectifier.
Figure 2:
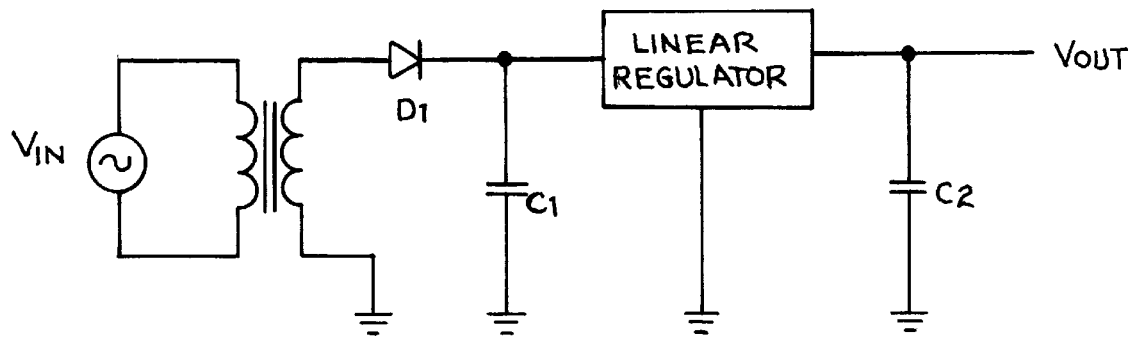
FIG. 2 is a schematic diagram which illustrates the step down transformer approach with a half wave rectifier.
Figure 3:
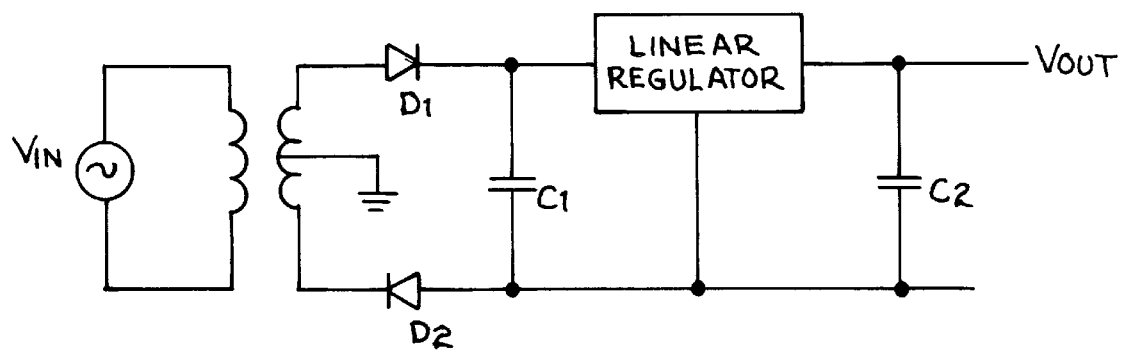
FIG. 3 is a schematic diagram illustrating the step down center tapped transformer approach with a full wave rectifier.
Figure 4:
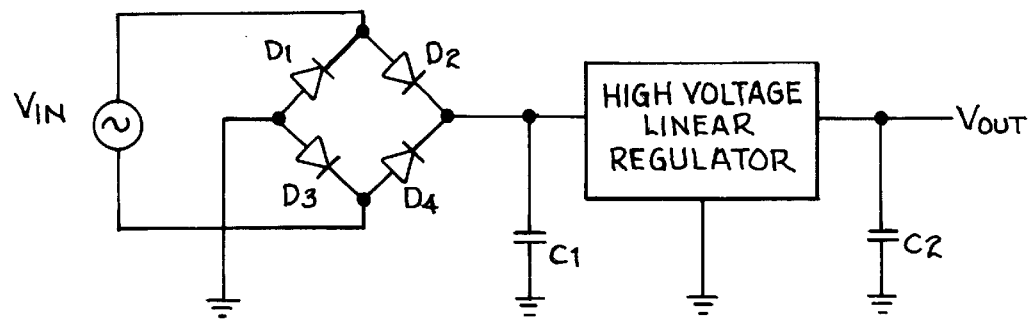
FIG. 4 is a schematic diagram of the high voltage linear regulator approach with a full wave rectifier.
Figure 5:
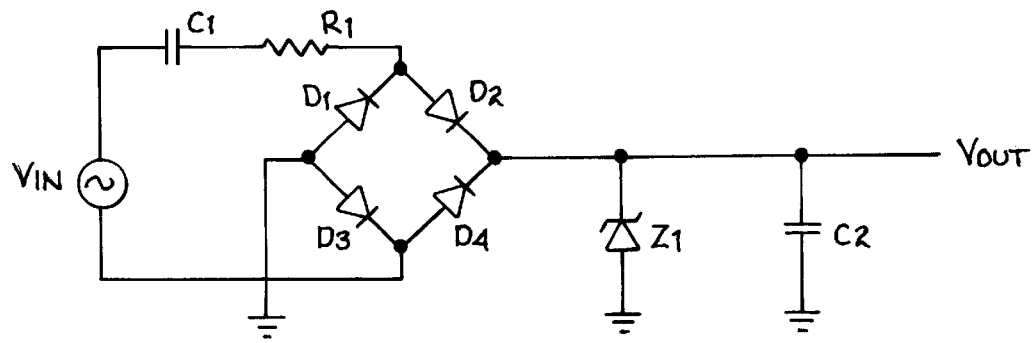
FIG. 5 is a schematic diagram of the high voltage capacitive coupling approach with a full wave rectifier.
Figure 6:
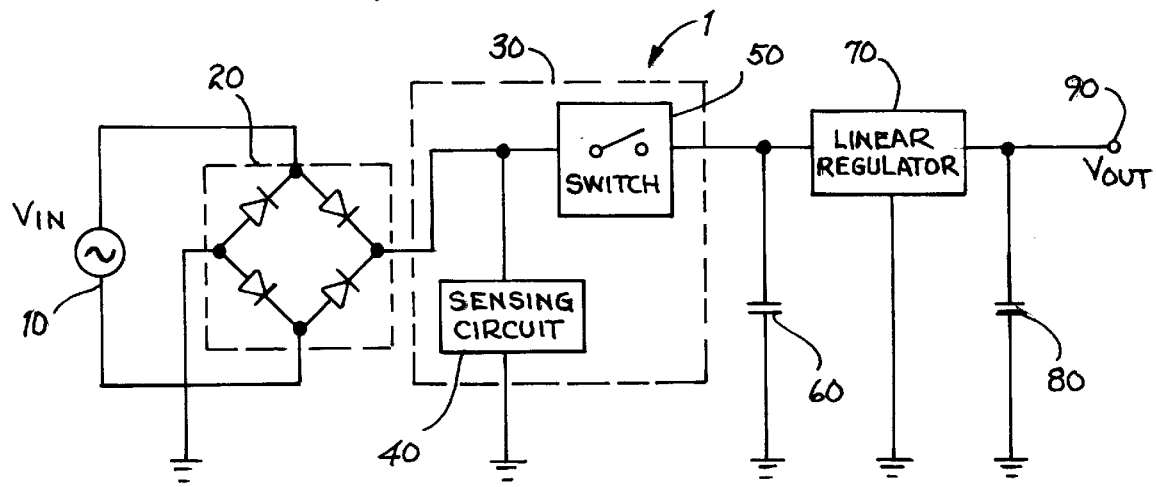
FIG. 6 is a block/schematic diagram of the present invention illustrating a tranformerless regulator.

Referring to FIG. 6, one embodiment of a device for converting high voltage alternating current to low voltage direct current 1 is illustrated as a block/schematic diagram. The invention is comprised of an input voltage ($V_{IN}$) 10, a rectifier 20 for converting the AC $V_{IN}$ to a DC voltage, a control circuit 30 coupled to the rectifier 20 and further comprised of a sensing circuit 40 to detect DC voltage levels and a switch 50, a linear regulator 70 coupled to the control circuit 30, a storage capacitor 60 and a filtering capacitor 80, each capacitor coupled to the linear regulator 70, and an output voltage ($V_{OUT}$) 90.

The input voltage, $V_{IN}$ 10, is a sinusoidal AC voltage typically in the range of 50–60 Hz and either 110–120 VAC or 220–240 VAC. $V_{IN}$ is rectified to produce a DC voltage. In the illustrated embodiment, a full wave rectifier is employed. In alternative embodiments, a half wave rectifier may be used.

The control circuit 30 is comprised of a sensing circuit 40 and a switch 50. The sensing circuit 40 may be a voltage detector, current detector or a one-shot circuit. The sensing circuit 40 will turn on, i.e. close, the switch 50 when $V_{IN}$ 10 is at a relatively low voltage and turn off, i.e. open, the switch 50 when $V_{IN}$ 10 is at a relatively high voltage. The voltage level to toggle the switch 50 between on and off is determined by the specification for the sensing circuit 40 which is coupled to the output of the rectifier 20. The switch 50 may be an enhancement mode MOSFET, a depletion mode MOSFET, a bipolar transistor, a photo transistor, an IGBT, a silicon controlled relay (SCR) or any other type of switch technology.

At a relatively low $V_{IN}$ 10, the sensing circuit 40 turns the switch 50 on and current will charge storage capacitor 60, thereby storing energy. As $V_{IN}$ 10 increases and reaches the trip point, the sensing circuit 40 turns off the switch 50, thus precluding current from reaching the load (not shown) and thereby reducing the power dissipation of the circuit. After $V_{IN}$ 10 reaches the peak of the sine wave, it begins to decrease to the point where the sensing circuit 40 once again turns on the switch 50 and current charges storage capacitor 60. This process repeats for each period of the sinusoidal $V_{IN}$ 10.

When the switch 50 is on, $V_{IN}$ 10 supplies the current to charge the storage capacitor 60 and also the current for the load (not shown) connected to $V_{OUT}$ 90. When the switch 50 is off, the storage capacitor 60 discharges to supply the current for the load. Thus, it is important that the storage capacitor 60 charges sufficiently to supply the requisite current for the load when the switch 50 is in the off state.

The combination of the linear regulator 70 and the filtering capacitor 80 stabilize the DC output voltage $V_{OUT}$ 90. The charging and discharging of the storage capacitor 60 will result in voltage ripples. The linear regulator 70 will provide a nearly constant DC output voltage without ripples. The filtering capacitor 80 acts as a filter to remove any ancillary AC component from the DC output voltage $V_{OUT}$ 90.

Figure 7:
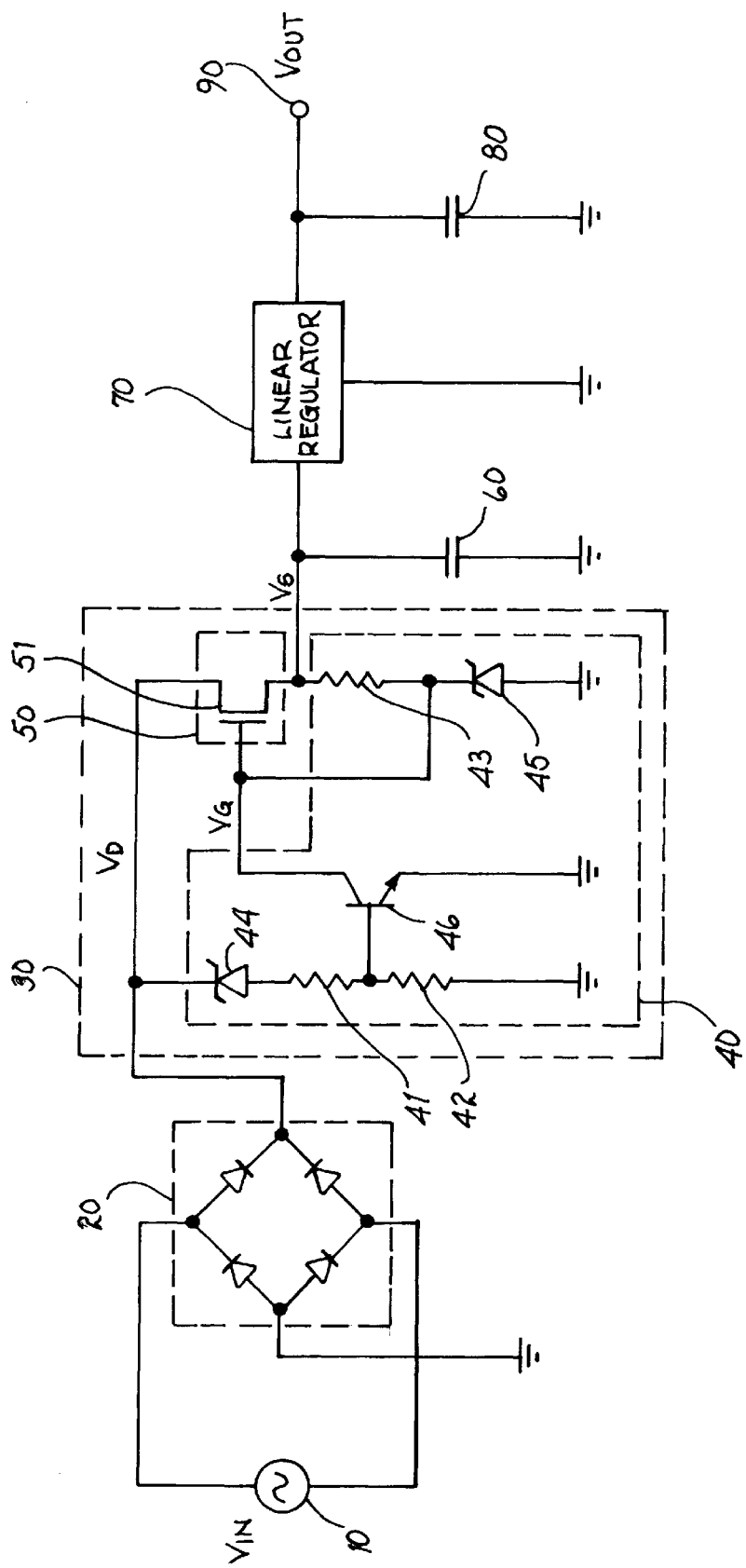
FIG. 7 is a schematic diagram of the present invention incorporating an N channel depletion mode transistor switch.

Referring to FIG. 7, wherein like numerals represent like elements, a detailed embodiment of the control circuit 30, shown in general terms in FIG. 6, is illustrated in the context of the complete conversion circuit 1. The control circuit 30 is comprised of a sensing circuit 40 in the form of a voltage detection circuit and a switch 50. The voltage detection circuit 40 is comprised of resistor 41, resistor 42, resistor 43, zener diode 44, zener diode 45, and transistor 46. The switch 50 is comprised of transistor 51. In the embodiment illustrated, the transistor 51 is a N channel depletion mode MOSFET.

Figure 8:
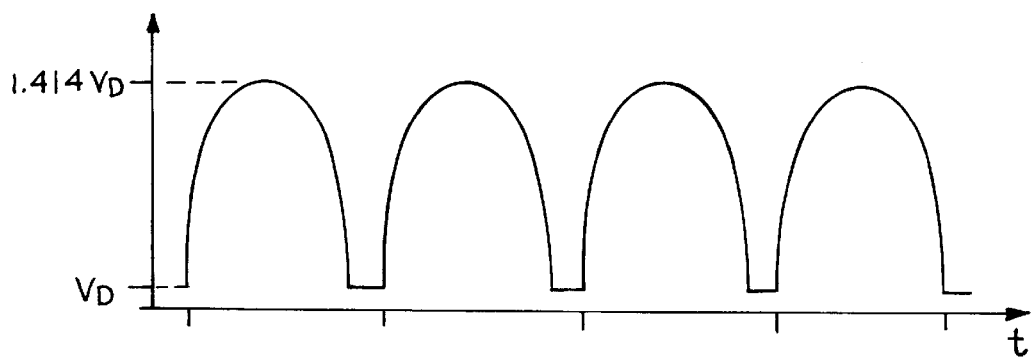
FIG. 8 is a wave form diagram of the input to the control circuit of the present invention.

Referring momentarily to FIG. 8, $V_D$ (drain voltage), which is the rectified result of $V_{IN}$, is shown. The peak voltage of $V_D$ is nominal voltage times 1.414 (RMS). For example, for a nominal voltage of 120 volts, the peak voltage is 1.414*120 volts or approximately 169 volts.

Returning to FIG. 7, when the voltage on the drain of transistor 51 $V_D$, reaches a preset trip point, the zener diode 44 will avalanche and begin to conduct. At this point current flows across the voltage divider defined by the resistor 41 and resistor 42. When the voltage at the base of the transistor 46 reaches $V_{BE}$, the transistor 46 turns on. Once transistor 46 is turned on, it will have the effect of shorting the gate of transistor 51 to ground. With $V_G$ of transistor 51 at ground potential and $V_S$ at a positive potential, transistor 51 has a negative gate to source voltage $V_{GS}$, thereby turning off transistor 51.

With transistor 51 off, the load (not shown) will cause the storage capacitor 60 to discharge via the linear regulator 70. Accordingly, as the storage capacitor 60 discharges, $V_S$ will decrease. During the discharge of the storage capacitor 51, $V_{IN}$ continues to increase, reaches its peak and then begins to decrease.

When the voltage on the drain of transistor 51 $V_D$ once again reaches the trip point, this time from a high to low potential, the zener diode 44 stops conducting, thereby turning off transistor 46. With transistor 46 off and $V_G$ of transistor 51 is no longer shorted to ground, transistor 51 will turn on. With transistor 51 on, storage capacitor 60 will begin to charge and current is provided to the linear regulator 70 and thus to the load. The cycle is repeated when $V_D$ reaches the trip point from a low to high potential.

The linear regulator 70 typically regulates an output voltage, $V_{OUT}$ 90, at to a voltage level below that of the trip point of the control circuit 30. The linear regulator 70 stabilizes $V_{OUT}$ 90 by removing any voltage ripples caused by the charging and discharging of the storage capacitor 60.

The voltage at $V_S$ for transistor 51 should always be at least 2.0 volts above the desired $V_{OUT}$ for the linear regulator 70 to operate properly. The breakdown voltage of zener diode 45 less the threshold voltage of transistor 51 will set the maximum voltage to be applied to the linear regulator 70. The resistor 43 sets the zenering current for zener diode 43.

The amount of voltage charged into storage capacitor 60 must be equal to or greater than the amount of voltage discharged by the load and the quiescent current of the linear regulator 70. The breakdown voltage value of zener diode 44 will determine the amount of charging time of the storage capacitor 60 by controlling the state of transistor 46, which in turn controls the state of the transistor 51.

Figure 9:
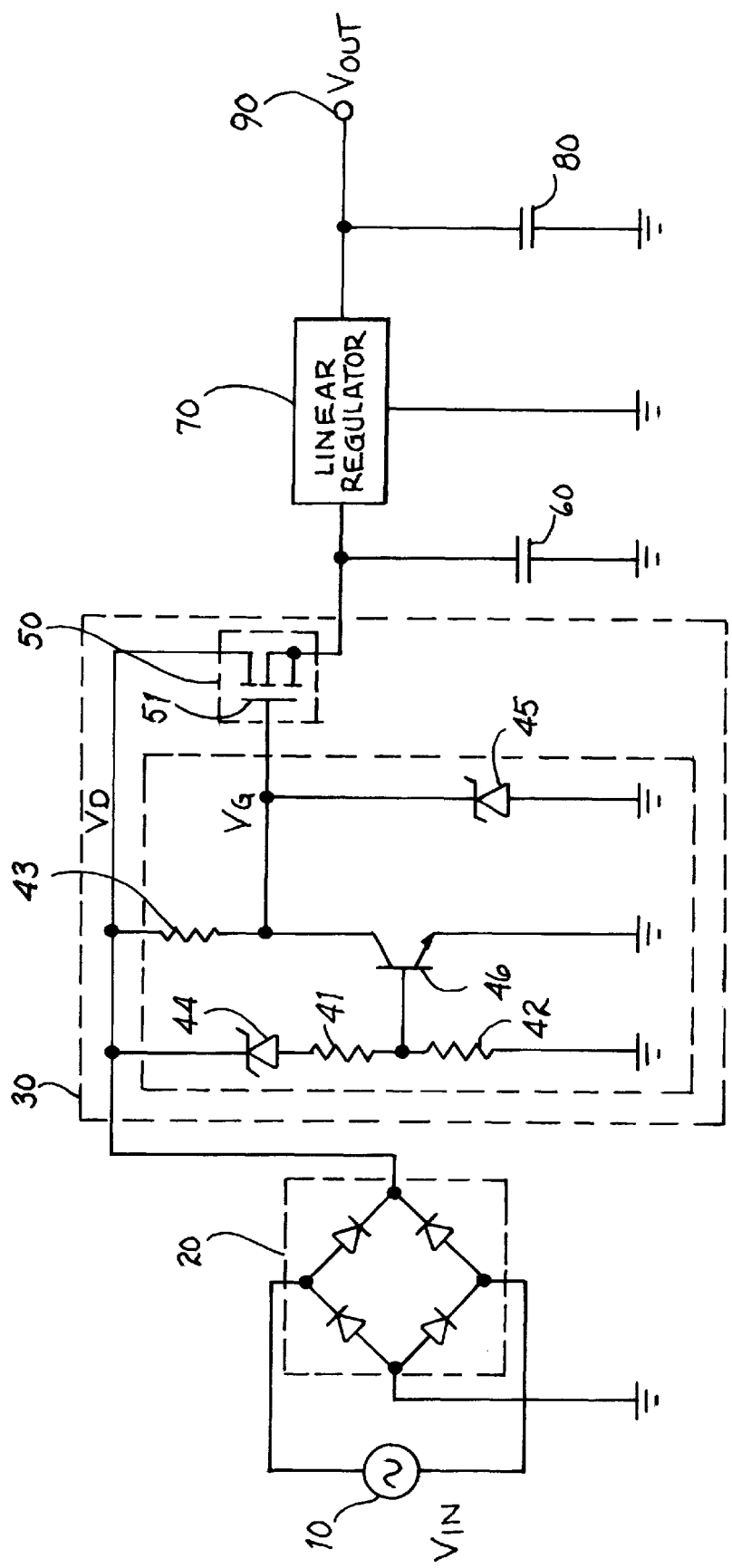
FIG. 9 is a schematic diagram of the of the present invention incorporating an N channel enhancement mode transistor switch.

Referring to FIG. 9, wherein like numerals reflect like elements, an alternative embodiment of the present invention is illustrated. In this embodiment an N channel enhancement mode MOSFET is substituted for the N channel depletion mode MOSFET of transistor 51 in FIG. 7. Also the biasing resistor 43 and the zener diode 45 are relocated from the source to the gate of transistor 51. The value of the breakdown voltage for the zener diode 45 may vary from the breakdown voltage value in the depletion mode embodiment for proper operation.

With the above modifications, the control circuit for the enhancement mode embodiment of FIG. 9 will operate similarly to the depletion mode embodiment. As $V_D$ increases and the trip point is reached, zener diode 44 breaks down and begins to conduct. Transistor 46 turns on when the voltage at the base of the transistor 46 reaches $V_{BE}$. With transistor 46 on, the voltage potential across $V_{GS}$ is very small, which turns transistor 51 off. Also, $V_G$ is clamped by zener diode 45.

With transistor 51 off, the load (not shown) will cause the storage capacitor 60 to discharge via the linear regulator 70 as in the depletion mode embodiment.

When the voltage on the drain of transistor 51, $V_D$, once again reaches the trip point, this time from a high to low potential, the zener diode 44 stops conducting, thereby turning off transistor 46. With transistor 46 off, transistor 51 will turn on. With transistor 51 on, storage capacitor 60 will begin to charge and current is provided to the linear regulator 70 and thus to the load as in the previously described depletion mode embodiment. The cycle is repeated when $V_D$ reaches the trip point from a low to high potential.

Figure 10:
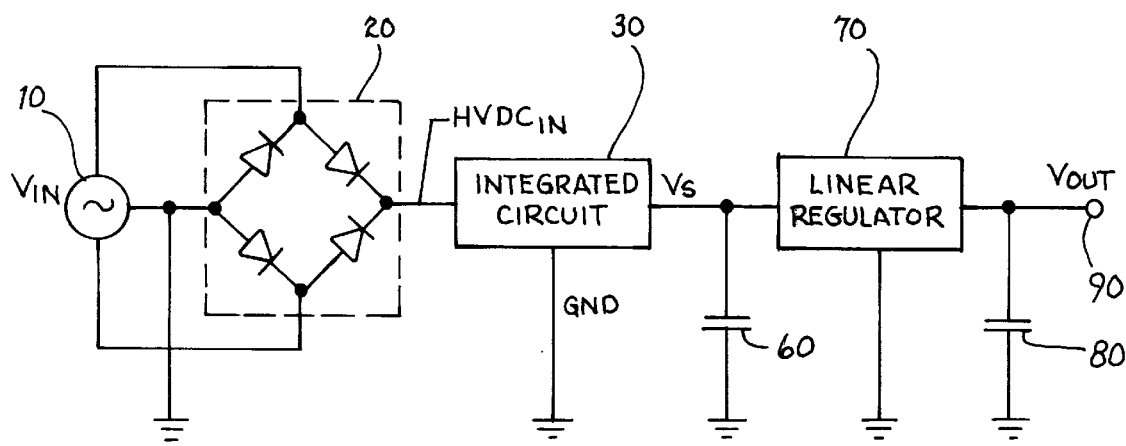
FIG. 10 is a block diagram of the present invention showing the control circuit as an integrated circuit (IC) and illustrating the requirement for only three I/O pins for the IC.

Referring to FIG. 10, wherein like numerals represent like elements, the integrated circuit embodiment of the control circuit 30 is illustrated, i.e. the control circuit is implemented on a single monolithic integrated circuit. The integrated circuit embodiment may be fabricated for either depletion mode control circuit (30 from FIG. 7) or the enhancement mode control circuit (30 from FIG. 9). Note that for either embodiment, the integrated control circuit 30 requires only three pins: $HVDC_{IN}$, i.e. the DC voltage from the rectifier; ground potential and $V_S$, i.e. the output voltage of the control circuit 30 as seen by the storage capacitor 60 and the linear rectifier 70.

Although the invention has been particularly shown and described with reference to a preferred embodiment thereof, it will be understood by those skilled in the art that changes in form and detail may be made therein without departing from the spirit and scope of the invention.

What is claimed is:

1. A device for converting high voltage alternating current to low voltage direct current comprising:
   an alternating current (AC) input voltage;
   a rectifier coupled to the AC input voltage;
   a control circuit connected to an output of the rectifier, the control circuit comprising:
      a voltage sensing circuit, the voltage sensing circuit comprising:
         a zener diode connected to the output of the rectifier;
         a voltage divider comprising a first resistor and a second resistor, wherein the first resistor is connected to the zener diode and the second resistor is connected to ground potential; and
         a sensing transistor wherein a base of the sensing transistor is connected to the voltage divider; and
      a switch comprising a MOSFET transistor wherein a gate electrode of the MOSFET transistor is connected to a collector of the sensing transistor, a drain electrode is connected to the output of the rectifier and a source electrode is coupled to ground potential;
   a linear regulator coupled to the control circuit; and
   a storage capacitor coupled to the control circuit and further coupled to the linear regulator.

2. The device in accordance with claim 1 further comprising a filtering capacitor coupled to the linear regulator.

3. The device in accordance with claim 1 wherein:
   the rectifier provides a drain voltage output to the MOSFET transistor; and
   the control circuit provides a source voltage output to the linear regulator and the storage capacitor.

4. The device in accordance with claim 3 wherein the source voltage output is equal to the drain voltage output.

5. The device in accordance with claim 3 wherein the source voltage output is less that the drain voltage output.

6. The device in accordance with claim 3 wherein:
   the linear regulator provides a regulated voltage output; and
   the regulated voltage output is less than the source voltage output.

7. The device in accordance with claim 1 wherein the switch having an on state and an off state controls an electrical current from the rectifier to the linear regulator.

8. The device in accordance with claim 7 wherein the voltage sensing circuit detects an output voltage of the rectifier.

9. The device in accordance with claim 7 wherein the voltage sensing circuit determines whether the switch is in the on state or the off state.

10. The device in accordance with claim 7 wherein a rectifier output current charges the storage capacitor when the switch is in the on state.

11. The device is accordance with claim 7 wherein the rectifier provides an output current to the linear regulator when the switch is in the on state.

12. The device in accordance with claim 7 wherein the capacitor discharges when the switch is in the off state.

13. The device in accordance with claim 7 wherein the capacitor provides current to the linear regulator when the switch is in the off state.

14. The device in accordance with claim 1 wherein the control circuit is implemented on a single monolithic integrated circuit.

15. The device in accordance with claim 14 wherein the single monolithic integrated circuit comprises three input/output pins.

16. The device in accordance with claim 15 wherein the three input/output pins comprise:
   a high voltage direct current input coupled to the control circuit;
   a ground potential coupled to the control circuit; and
   a voltage output coupled to the control circuit.

17. A device for converting high voltage alternating current to low voltage direct current comprising:
   an alternating current (AC) input voltage;
   a rectifier coupled to the AC input voltage;
   a control circuit connected to an output of the rectifier, the control circuit comprising:
      a voltage sensing circuit, the voltage sensing circuit comprising:
         a zener diode connected to the output of the rectifier;
         a voltage divider comprising a first resistor and a second resistor, wherein the first resistor is connected to the zener diode and the second resistor is connected to ground potential; and
         a first transistor wherein a base of the transistor is connected to the voltage divider; and
      a switch comprising a second transistor wherein a control electrode of the second transistor is connected to a collector of the first transistor, a first current conducting electrode of the second transistor is connected to the output of the rectifier and a second current conducting electrode of the second transistor is coupled to ground potential;
   a linear regulator coupled to the control circuit; and
   a storage capacitor coupled to the control circuit and further coupled to the linear regulator.

18. The device in accordance with claim 17 further comprising a filtering capacitor coupled to the linear regulator.

19. The device in accordance with claim 17 wherein the switch having an on state and an off state controls an electrical current from the rectifier to the storage capacitor.

20. The device in accordance with claim 19 wherein the voltage sensing circuit determines whether the switch is in the on state or the off state.

* * * * *